(12) United States Patent
Odaka et al.

(10) Patent No.: US 7,304,410 B2
(45) Date of Patent: Dec. 4, 2007

(54) ELECTROSTATIC MOTOR INCLUDING PROJECTIONS PROVIDING A CLEARANCE BETWEEN STATOR AND SLIDER ELECTRODE MEMBERS

(75) Inventors: Shunichi Odaka, Minamitsuru-gun (JP); Isao Kariya, Minamitsuru-gun (JP)

(73) Assignee: Fanuc Ltd, Yamanashi (JP)

(*) Notice: Subject to any disclaimer, the term of this patent is extended or adjusted under 35 U.S.C. 154(b) by 204 days.

(21) Appl. No.: 11/089,150

(22) Filed: Mar. 25, 2005

(65) Prior Publication Data

US 2005/0212382 A1  Sep. 29, 2005

(30) Foreign Application Priority Data

Mar. 25, 2004  (JP) .............................. 2004-089479

(51) Int. Cl.
*H02N 1/00* (2006.01)
(52) U.S. Cl. ..................................... 310/309
(58) Field of Classification Search ................. 310/309
See application file for complete search history.

(56) References Cited

U.S. PATENT DOCUMENTS

| 5,461,272 | A | | 10/1995 | Matsumoto ................. 310/309 |
| 5,627,339 | A | * | 5/1997 | Brown et al. ............... 149/19.3 |
| 6,359,367 | B1 | | 3/2002 | Sumanaweera et al. ..... 310/309 |
| 6,922,274 | B2 | * | 7/2005 | Takeuchi et al. ............ 359/292 |
| 2005/0212382 | A1 | * | 9/2005 | Odaka et al. ................ 310/309 |

FOREIGN PATENT DOCUMENTS

| JP | 3-40777 | | 2/1991 |
| JP | 04-340371 | * | 11/1992 |
| JP | 04-207981 | * | 2/1996 |
| JP | 08-051786 | * | 2/1996 |
| JP | 09-121563 | * | 5/1997 |
| JP | 10-225145 | * | 8/1998 |
| JP | 2001-178154 | * | 6/2001 |
| WO | 03/061107 | | 7/2003 |

OTHER PUBLICATIONS

Manual translation 08-51786, Feb. 1996.*

(Continued)

*Primary Examiner*—Karl Tamai
(74) *Attorney, Agent, or Firm*—Drinker Biddle & Reath LLP

(57) ABSTRACT

An electrostatic motor includes a stator electrode member (1a) and a slider electrode member (1b). The stator electrode member (1a) and the slider electrode member (1b) are provided with drive electrode patterns (2), and the drive electrode patterns are covered by cover films (4). Surfaces of the stator electrode member (1a) and the slider electrode member (1b) contacting each other are provided with a plurality of minute projections (5). A clearance between the stator electrode member and the slider electrode member is maintained by the contact of the projections. The projections (5) may also be provided on only one of the stator electrode member (1a) and the slider electrode member (1b), with the other electrode member having a flat surface.

7 Claims, 9 Drawing Sheets

OTHER PUBLICATIONS

Manual translation 2001-178,154, Jun. 2001.*
Manual translation, jp 09-121563, Shinji Kon'no, "Electrostatic Actuator", May 6, 1997.*
Manual translation, jp 04-340371, Toshio Higuchi et al., "Electrostatic Actuator", Nov. 26, 1992.*
Manual translation, jp 04-207981, Masafumi Yano et al., "Power Generator Utilizing Electrostatic Force", Jul. 29, 1992.*
Toshiki Niino, "Development of An Electrostatic Actuator Exceeding 10N Propulsive Force,", IEEE MEMS '92, Feb. 4-7, 1992, Germany.

* cited by examiner

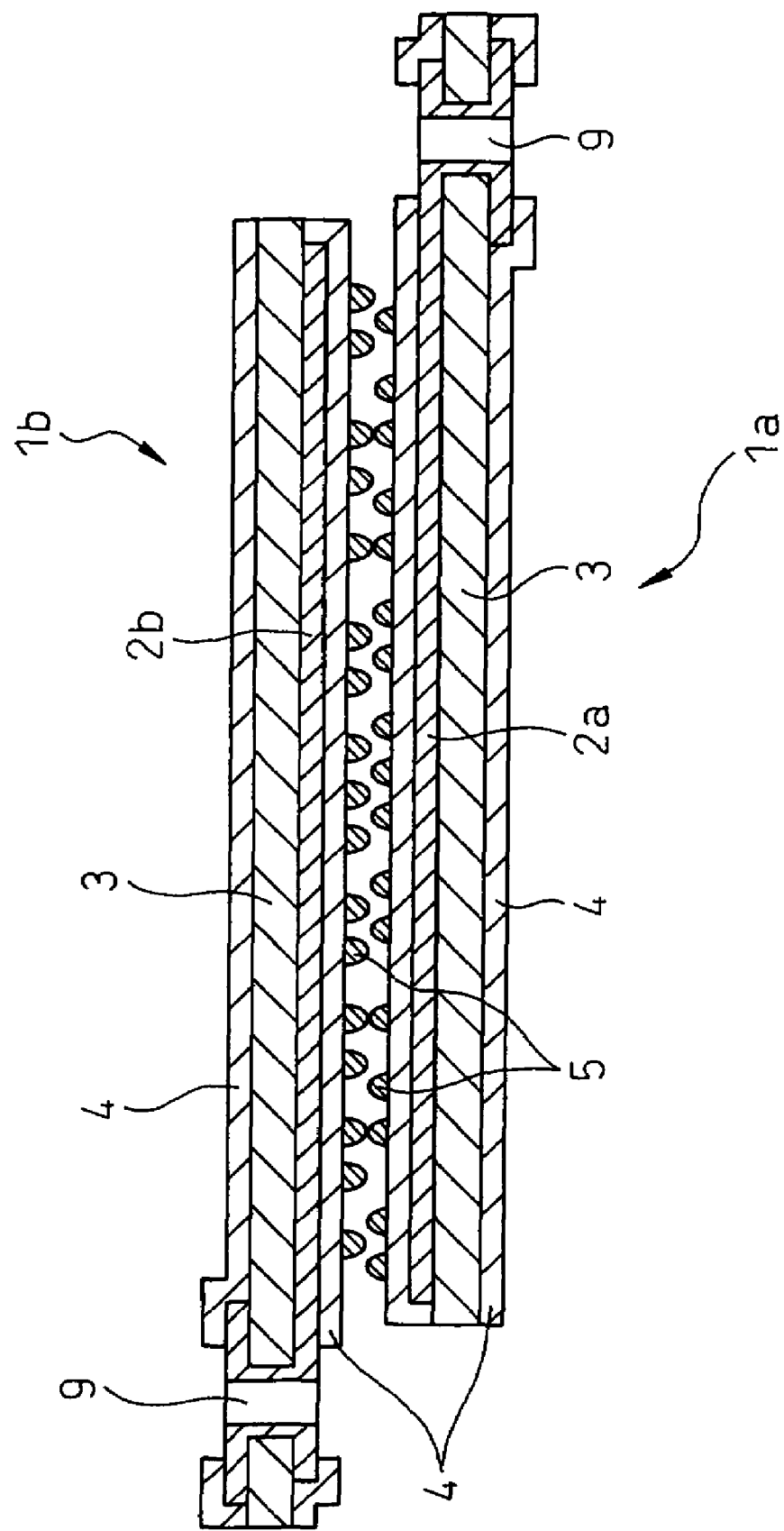

ELECTROSTATIC MOTOR INCLUDING PROJECTIONS PROVIDING A CLEARANCE BETWEEN STATOR AND SLIDER ELECTRODE MEMBERS

BACKGROUND OF THE INVENTION

1. Field of the Invention

The present invention relates to an electrostatic motor driven by electrostatic force.

2. Description of the Related Art

An electrostatic motor includes a stator electrode member and a slider electrode member, which are provided with drive electrode patterns comprised of a plurality of conductors arranged at a fine pitch. An electrostatic motor is driven by applying cyclic voltage to these drive electrode patterns and utilizing the electrostatic attraction force between different polar electrodes and the electrostatic repulsion force between same polar electrodes between the stator electrode member and the slider electrode member, thereby causing the slider electrode member to slide relative to the stator electrode member.

Such an electrostatic motor includes a linear type and a rotary type. In a linear electrostatic motor, the slider electrode member is made to relatively slide linearly with respect to the stator electrode member. On the other hand, in a rotary electrostatic motor, the slider electrode member is made to rotate relatively with respect to the stator electrode member. In each type, the stator electrode member and the slider electrode member are arranged to face each other across a fine clearance in order to make the electrostatic motor work effectively and, at the same time, bead-shaped spherical members or cylindrical members having very small diameters are interposed between the two electrode members in order to reduce resistance due to mechanical friction between the two electrode members.

Further, in order to put the electrostatic motor to practical use, it is necessary to provide a high electric field. However, if there is gas present between the drive electrode patterns of the stator electrode member and the drive electrode patterns of the slider electrode member, a corona discharge etc. will be generated, so it will become difficult to maintain the insulation. Accordingly, the space between the drive electrode patterns of the stator electrode member and the drive electrode patterns of the slider electrode member had to be filled with an insulating liquid or made a vacuum ("Development of an Electrostatic Actuator Exceeding 10N Propulsive Force", IEEE MEMS' 92, Travemunde (Germany), Feb. 4-7, 1992, Toshiki NIINO et al).

FIG. 12 is a sectional view of a conventional electrode member 1 constituting a stator electrode member 1a or a slider electrode member 1b. The stator electrode member 1a and the slider electrode member 1b are configured substantially the same. At the time of production of the electrode member 1, a conductor such as a copper foil is attached by a binder to a base film 3 formed by an insulator (plastic film) and then etched etc. to form drive electrode patterns 2 on the base film 3. Next, the two surfaces of the base film 3 are covered by cover films 4 of an insulator (plastic films) to form insulating layers. Further, holes for connecting a power supply to the drive electrode patterns are formed in the electrode member 1.

FIGS. 13A to 13D are views for illustrating a conventional linear electrostatic motor. FIG. 13A is a perspective view of an electrode member 1 forming part of the linear electrostatic motor. One surface of the electrode member 1 is formed with drive electrode patterns 2 including three phase electrodes. In the drive electrode patterns 2, power supply holes for the different phases and the phase electrodes for the different phases are connected by conduction passages. Note that in order to avoid the conduction passages for the different phases intersecting with the electrodes etc. for other phases, the conduction passage for one phase electrode among the three phases is provided on the other surface of the electrode member 1. Further, the cover films 4 are attached by a binder to both surfaces of the electrode member 1 so as to cover the electrodes and conduction passages and form insulation layers. Note that FIGS. 13A to 13C show the cover films 4 as transparent members for the purpose of the explanation.

FIG. 13B shows a state where beads 10 are scattered on the electrode member 1 in order to maintain a clearance between the stator electrode member 1a and the slider electrode member 1b. Further, FIG. 13C shows an electrostatic motor built up of a set of a stator electrode member 1a and a slider electrode member 1b arranged parallel to each other. The stator electrode member 1a and the slider electrode member 1b are arranged so that the surfaces of the electrode members 1a and 1b provided with the drive electrode patterns 2 face each other. Further, FIG. 13D is a sectional view of the electrostatic motor built up of the set of the stator electrode member 1a and the slider electrode member 1b. The beads 10 are introduced together with an insulating liquid etc. into the clearance between the stator electrode member 1a and the slider electrode member 1b from one end of the clearance between the stator electrode member 1a and the slider electrode member 1b and flow out of the other end of the clearance and therefore flow through the clearance between the stator electrode member 1a and the slider electrode member 1b together with the insulating liquid. These beads 10 enable the clearance between the stator electrode member 1a and the slider electrode member 1b to be held.

The beads or cylindrical members used for holding the clearance between the stator electrode member and the slider electrode member and reducing the frictional resistance are not fixed, but are located in the clearance between the stator electrode member and the slider electrode member in a free state. Accordingly, when an insulating liquid is used as a medium for filling the clearance, the beads or cylindrical members are discharged from the clearance together with the insulating liquid, so the beads etc. must be mixed into the insulating liquid and introduced into the clearance between the two electrode members again. However, the clearance between the stator electrode member and the slider electrode member is a very narrow clearance of about tens of micrometers, therefore, it is difficult to make the beads etc. enter into this clearance again. For this reason, the beads etc. present in this clearance are decreased and, as a result, the stator electrode member and the slider electrode member directly contact each other to increase the frictional resistance between the electrode members. Further, over the long term, the stator electrode member and the slider electrode member are damaged by the friction resulting in electrical leakage, short-circuits and thereby reducing the service life.

SUMMARY OF THE INVENTION

Accordingly, an object of the present invention is to provide an electrostatic motor which can prolong the service life of the stator electrode member and the slider electrode member.

According to a first aspect of the present invention, there is provided an electrostatic motor which includes a stator electrode member and a slider electrode member relatively sliding while contacting each other, wherein a plurality of minute projections are provided on facing surfaces of the stator electrode member and the slider electrode member, and a clearance between the stator electrode member and the slider electrode member is maintained by the contact of the projections.

Further, according to a second aspect of the present invention, there is provided an electrostatic motor which includes a stator electrode member and a slider electrode member relatively sliding while contacting each other, wherein a plurality of minute projections are provided on one of a surface of the stator electrode member and a surface of the slider electrode member facing each other, and a clearance between the stator electrode member and the slider electrode member is maintained by contact of the projections and the other of the surface of the stator electrode member and the surface of the slider electrode member facing each other.

In the electrostatic motor, in order to reduce the frictional force due to contact between the stator electrode member and the slider electrode member, a liquid is preferably interposed in a clearance between the stator electrode member and the slider electrode member. In this case, the liquid may be an insulating liquid, for example, dimethylpolysiloxane or a fluorocarbon.

Further, in the electrostatic motor, the stator electrode member or the slider electrode member preferably includes a molded member for forming a contacting surface, and a conductor or a portion having a mechanical function which is attached to the molded member.

The stator electrode member or the slider electrode member may include a member for forming a contacting surface, and the member may be formed by a polyimide or a fluororesin.

Preferably, the projections have a ridge-shape, and the ridge-shaped projections of the stator electrode member and the ridge-shaped projections of the slider electrode member are skewed from each other by a predetermined angle.

According to the present invention, a plurality of projections are provided at one or both of the contacting surfaces of the stator electrode member and the slider electrode member. By the contact of the projections of one surface with the contacting surface or projections of the other surface, the clearance between the stator electrode member and the slider electrode member is maintained and therefore the service life of the stator electrode member and the slider electrode member can be prolonged.

BRIEF DESCRIPTION OF THE DRAWINGS

These and other objects, features, and advantages of the present invention will be described in more detail below based on preferred embodiments of the present invention with reference to the accompanying drawings, in which:

FIG. 1 is a sectional view of principal parts of an electrostatic motor built up of a set of a stator electrode member and a slider electrode member according to a first embodiment of the present invention;

DETAILED DESCRIPTION

Figure 2A:
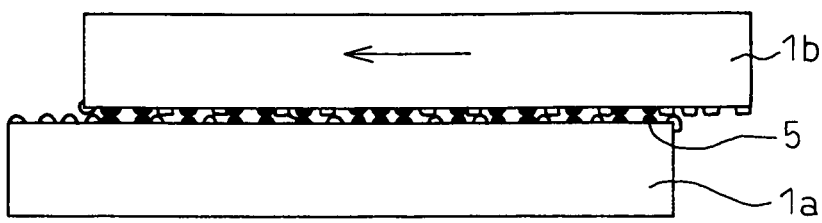
FIGS. 2A to 2F are schematic views for illustrating the operation of the electrostatic motor of FIG. 1.
Figure 2B:
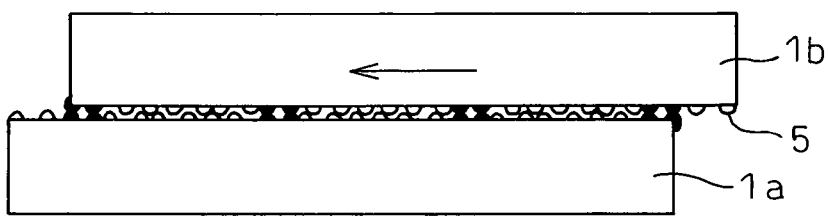
Figure 2C:
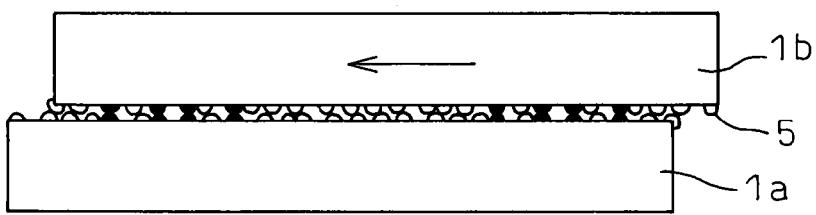
Figure 2D:
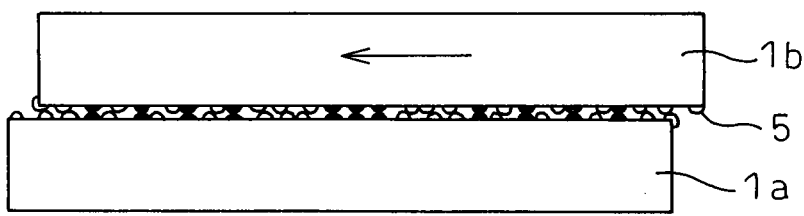
Figure 2E:
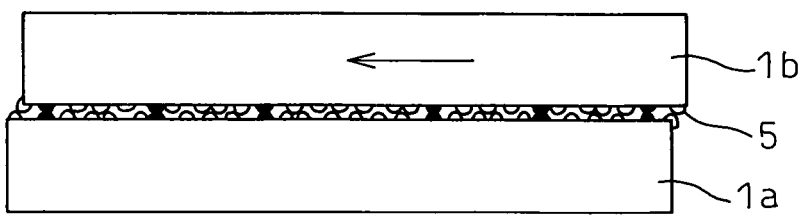
Figure 2F:
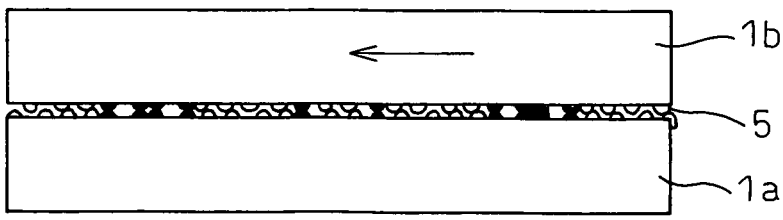

Several embodiments of the present invention will be described below with reference to the accompanying drawings.

FIG. 1 is a sectional view of principal parts of an electrostatic motor built up of a set of a stator electrode member 1a and a slider electrode member 1b according to a first embodiment of the present invention.

The stator electrode member 1a and slider electrode member 1b of the electrostatic motor according to the first embodiment is different from the conventional stator electrode member and slider electrode member in that convex projections 5 are fixed to facing surfaces of the stator electrode member 1a and the slider electrode member 1b of the electrostatic motor according to the first embodiment of the present invention. The rest of the configuration is the same as that of the conventional stator electrode member and slider electrode member described with reference to FIG. 12 and FIGS. 13A to 13D. The projections 5 provided on the facing surfaces of these stator electrode member 1a and slider electrode member 1b contact each other to thereby maintain a clearance between the stator electrode member 1a and the slider electrode member 1b. Such projections 5 may be arranged with a constant pattern or may be arranged at random. Note that as the slider electrode member 1b relatively slides with respect to the stator electrode member 1a, it is desirable that the projections 5 are arranged so that the number of contacting projections 5 and intervals between the contacting projections 5 will not largely change by the change of relative positions of the stator electrode 1a and the slider electrode 1b due to the sliding.

The method of fixing such projections 5 to the surfaces of the electrode members 1 includes the method of using a binder to attach projections 5 formed by a material such as plastic having a small frictional coefficient onto a cover film 4 covering drive electrode patterns 2a of the stator electrode or drive electrode patterns 2b of the slider electrode, the method of welding projections 5 formed by a plastic material etc. onto the cover film 4 by ultrasonic friction welding or the like, and the method of applying liquidized projecting members to the cover film 4 and then solidifying them.

The projections 5 are shaped so that their tips have smoothed convex surfaces forming parts of spherical members or elliptical members, etc., to decrease the contact pressure and reduce the frictional resistance.

As an example of the actual dimensions, when a distance by which the projections 5 move in the horizontal direction until the projections 5 contact each other, that is, a horizontal mean distance, is 40 μm and a radius of the projections 5 is about 5 μm, the thickness of each electrode member 1 is made 100 μm or more. It should be noted that a sufficient number of projections 5 should be provided to make the interval between the projections 5 narrow and the flat portions having no projections 5 in the stator electrode member 1a and the slider electrode member 1b must only bend a little so as to prevent contact at portions other than the projections 5. Further, when interposing an insulating liquid in the clearance between the stator electrode member 1a and the slider electrode member 1b in order to maintain the insulation, as the insulating liquid, use is made of dimethyl polysiloxane, a fluorocarbon, etc. By using such an insulating liquid, an effect of reducing the frictional resistance due to the contact of projections can be obtained.

FIGS. 2A to 2F are schematic views for illustrating operations of the electrostatic motor shown in FIG. 1 and show processes in which the slider electrode member 1b is driven to slide from right to left in the figure with respect to the stator electrode member 1a. The projections 5 shown in black in FIGS. 2A to 2F contact each other and function to hold the interval or clearance between the stator electrode member 1a and the slider electrode member 1b. On the other hand, the projections 5 shown in white do not contact each other. As shown in FIGS. 2A to 2F, in the electrostatic motor according to the present invention, even when the slider electrode member 1b relatively slides with respect to the stator electrode member 1a, the projections 5 contact each other without bias over the entire facing surfaces of the stator electrode member 1a and the slider electrode member 1b, and the stator electrode member 1a and the slider electrode member 1b are maintained at a predetermined interval.

Figure 3:
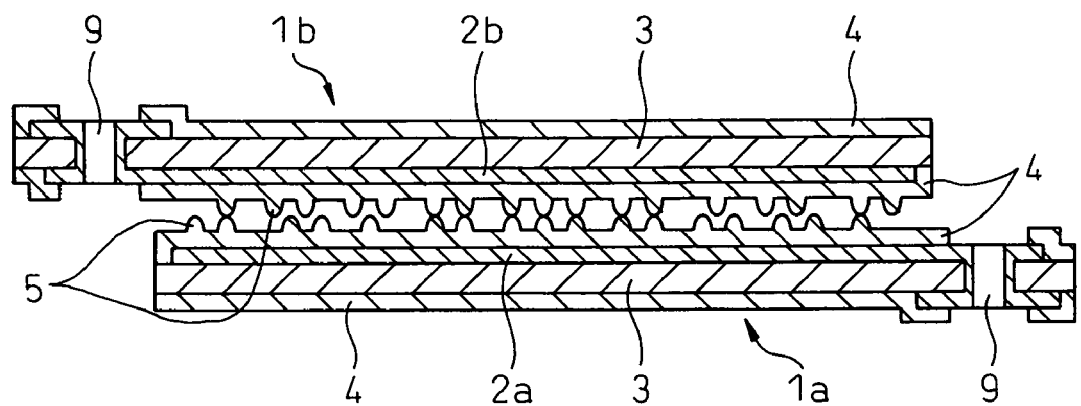
FIG. 3 is a sectional view of principal parts of an electrostatic motor built up of a set of a stator electrode member and a slider electrode member according to a second embodiment of the present invention.

FIG. 3 is a sectional view of principal parts of an electrostatic motor built up of a set of a stator electrode member 1a and a slider electrode member 1b according to a second embodiment of the present invention.

In the electrostatic motor according to the second embodiment, the projections 5 and the cover films 4 (plastic films) are integrally formed. The cover films 4 are formed so that projections 5 forming parts of spherical members or elliptical members, etc., are formed on the surfaces of the cover films 4. The cover films 4 are attached by a binder to the drive electrode side surfaces of the base films 3 provided with the stator drive electrode patterns 2a and the slider drive electrode patterns 2b, so that they cover the stator drive electrode patterns 2a or the slider drive electrode patterns 2b. The stator electrode member 1a and the slider electrode member 1b are produced in this way. The stator electrode member 1a and the slider electrode member 1b produced in this way are arranged so that the surfaces provided with the projections 5 face each other so as to form the electrostatic motor. In the electrostatic motor according to the second embodiment as well, an insulating liquid such as dimethyl polysiloxane or a fluorocarbon can be interposed in the clearance between the stator electrode member 1a and the slider electrode member 1b.

Figure 4:
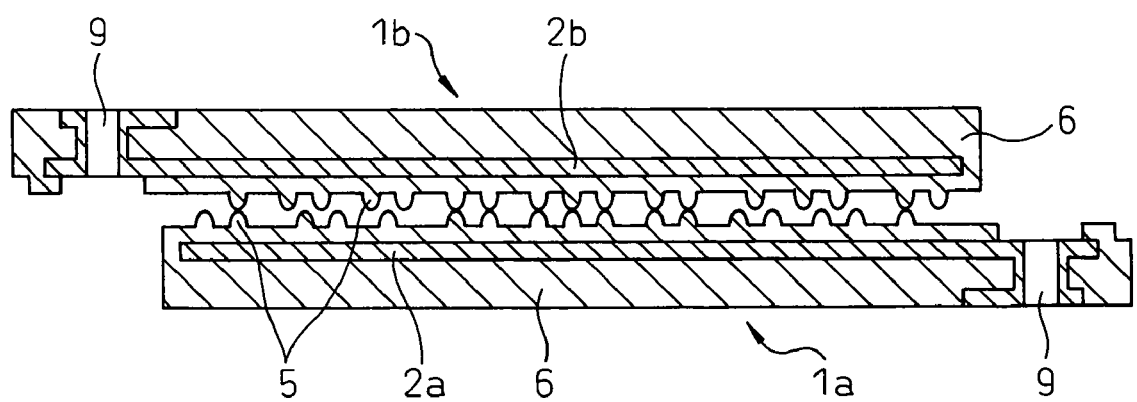
FIG. 4 is a sectional view of principal parts of an electrostatic motor built up of a set of a stator electrode member and a slider electrode member according to a third embodiment of the present invention.

FIG. 4 is a sectional view of principal parts of an electrostatic motor built up of a set of a stator electrode member 1a and a slider electrode member 1b according to a third embodiment of the present invention.

In the third embodiment, use is made of a stator electrode member 1a or a slider electrode member 1b formed by supporting members for forming the drive electrode patterns 2a or 2b in the air and in that state molding an insulating material 6 around them. The mold used for such a molding process is provided with shapes corresponding to the projections 5 of the molded article so that the projections 5 are integrally formed with the electrode member. If using insulative support members for supporting the members for forming the stator drive electrode patterns 2a or the slider drive electrode patterns 2b during the molding process, the insulative support members are preferably formed from a material of the same type as the insulating material to be molded so that the insulative support members fuse well with the insulating material.

As such a material to be molded, use is made of a material solidified by chemical reaction, for example, an epoxy resin. An insulating filler is mixed according to need to thereby improve the strength, rigidity, and dimensional stability. Further, as the material to be molded, use may be made of a plastic resin such as a polyester resin or a melted glass material. Further, a powder of for example alumina or zirconia may be used and shaped by sintering. The stator electrode member 1a and slider electrode member 1b obtained in this way are used to form an electrostatic motor. In the electrostatic motor according to the third embodiment as well, as in the electrostatic motors according to the first and second embodiments, an insulating liquid may be interposed in the clearance between the stator electrode member 1a and the slider electrode member 1b.

Figure 5A:
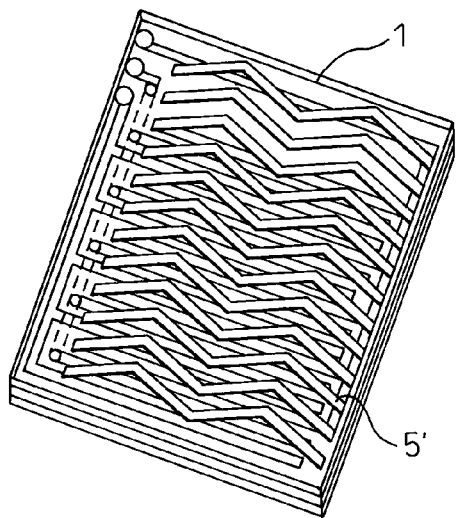
FIGS. 5A to 5C are views for illustrating an electrostatic motor according to a fourth embodiment of the present invention.
Figure 5B:
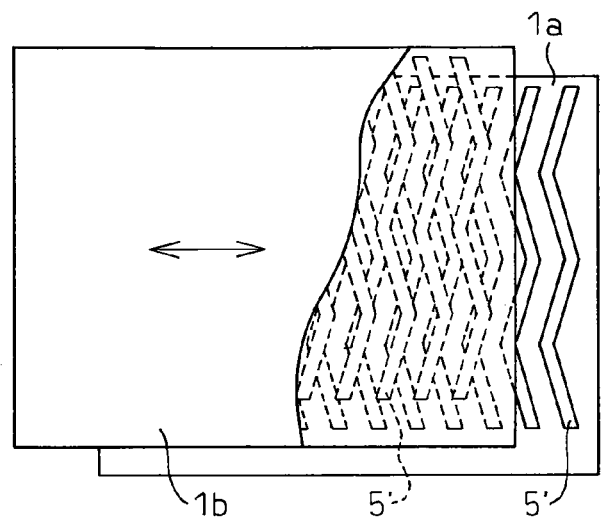
Figure 5C:
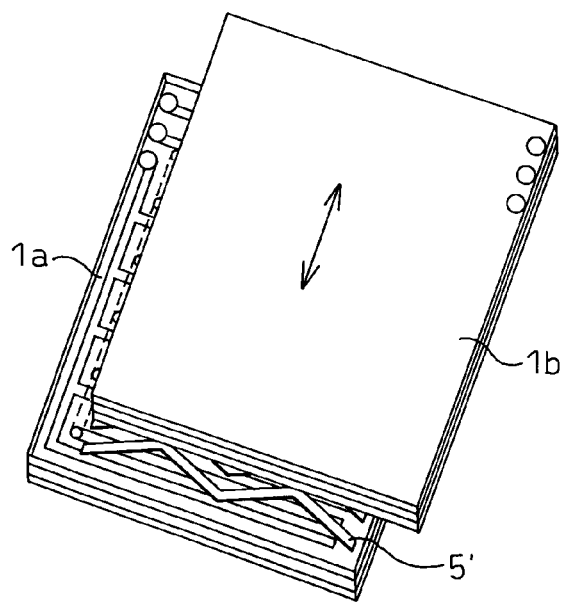

FIGS. 5A to 5C are views for illustrating an electrostatic motor according to a fourth embodiment of the present invention. For purposes of the illustration, the base films 3 and the cover films 4 are shown in FIGS. 5A to 5C as if they were transparent. The electrostatic motor according to the fourth embodiment is an example of a linear electrostatic motor and is different from the electrostatic motors according to the first to third embodiment in that ridge-shaped projections 5', in place of the projections 5 forming parts of spherical members or elliptical members, etc., of the first to third embodiments, are provided on the facing surface of the stator electrode member 1a or the slider electrode member 1b. Note that when a plurality of sets of the stator electrode members 1a and the slider electrode members 1b are stacked to form the electrostatic motor, the ridge-shaped projections 5' may be provided on both surfaces as well.

FIG. 5A is a perspective view of an electrode member 1 which constitutes the stator electrode member 1a or the slider electrode member 1b and which is arranged so that the side where the drive electrode patterns 2a or 2b are provided faces upward. In the electrode member 1, the surface of the cover film 4 on the side provided with the drive electrode patterns 2a, 2b is provided with ridge-shaped projections 5'. The plurality of ridge-shaped projections 5' shown in FIG. 5A are arranged in parallel at predetermined intervals. Further, the top ends of the ridge-shaped projections 5' are formed to be flat or slightly rounded. The ridge-shaped projections 5' provided on the stator electrode member 1a and the ridge-shaped projections 5' provided on the slider electrode member 1b are also formed skewed.

FIG. 5B is a diagrammatic view showing a stator electrode member 1a and a slider electrode member 1b formed so that the ridge-shaped projections 5' provided on the stator electrode member 1a and the ridge-shaped projections 5' provided on the slider electrode member 1b are skewed by 180 degrees. Since the ridge-shaped projections 5' are formed to extend in an undulated form, the ridge-shaped projections 5' of one electrode member do not fitted in valley portions formed between adjacent ridge-shaped projections 5' of the other electrode member, and the slider electrode member 1b relatively slides with respect to the stator electrode member 1a in a state where the top surfaces of the ridge-shaped projections 5' of the facing electrode members contact each other. By arranging the stator electrode member 1a and the slider electrode member 1b with the ridge-shaped projections 5' thereof skewed with respect to each other in this way so that the surfaces thereof having the ridge-shaped projections 5' face each other as shown in FIG. 5C, an electrostatic motor is formed.

The ridge-shaped projections 5' of the stator electrode member 1a and the slider electrode member 1b need not be skewed by 180 degrees with respect to each other as shown in FIG. 5B. It is sufficient so far as a certain extent of inclination exists so that the ridge-shaped projections 5' of one electrode member do not fit in the valley portions formed between the ridge-shaped projections 5' of the other electrode member. Further, it is also possible even if the ridge-shaped projections 5' are not formed to extend in an undulated form as shown in FIGS. 5A to 5C, but are formed to extend straightly. A skew may be given so that lines of the ridge-shaped projections 5' of the stator electrode member 1a extend across lines of the ridge-shaped projections 5' of the slider electrode member 1b when the stator electrode member 1a and the slider electrode member 1b are arranged facing each other.

Figure 6A:
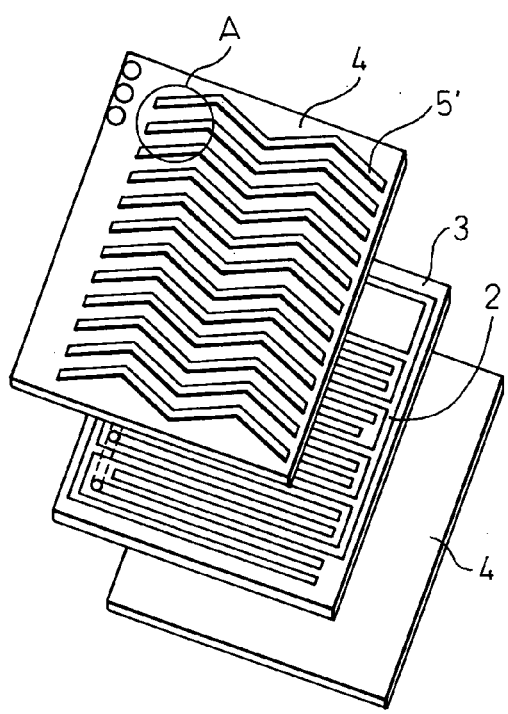
FIGS. 6A and 6B are views for illustrating the configuration of electrode members of the electrostatic motor according to the fourth embodiment shown in FIGS. 5A to 5C.
Figure 6B:
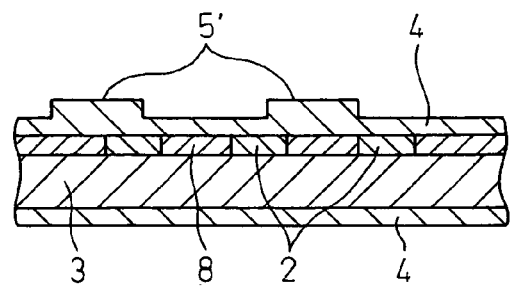

FIGS. 6A and 6B are views for illustrating the configuration of the electrode members 1 used as the stator electrode member 1a and the slider electrode member 1b according to the fourth embodiment. FIG. 6A is an exploded view of the electrode member 1, while FIG. 6B is a sectional view of the portion indicated by "A" in FIG. 6A.

Cover films 4 formed from a polyimide are attached by a binder such as an epoxy binder etc. to two surfaces of a base film 3 of a polyimide provided with the drive electrode patterns 2. A cover film 4 having a surface thereof formed with ridge-shaped projections 5' is attached by a binder to the side of the base film 3 where the drive electrode patterns 2 are provided. Note that reference numeral 8 in FIG. 6B shows the layer of the binder. In the fourth embodiment as well, as in the above embodiments, an insulating liquid can be interposed in the clearance between the stator electrode member 1a and the slider electrode member 1b.

Figure 7:
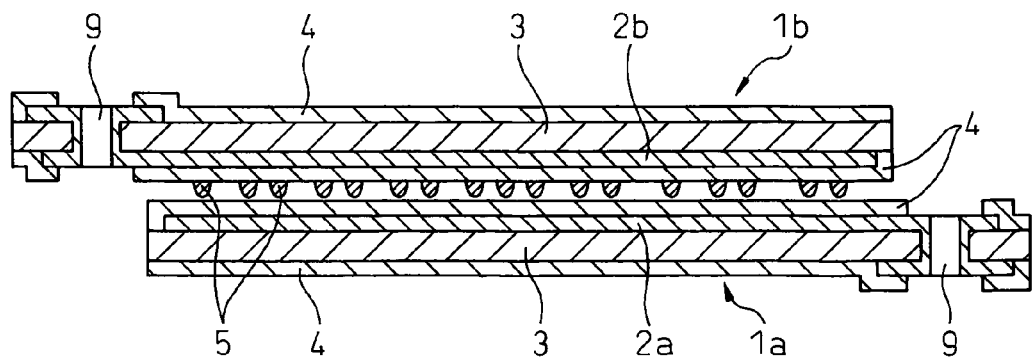
FIG. 7 is a sectional view of principal parts of an electrostatic motor built up of a set of a stator electrode member and a slider electrode member according to a fifth embodiment of the present invention.

FIG. 7 is a sectional view of principal parts of an electrostatic motor built up of a set of a stator electrode member 1a and a slider electrode member 1b according to a fifth embodiment of the present invention.

In the electrostatic motor according to the fifth embodiment, one of the stator electrode member 1a and the slider electrode member 1b has projections 5 fixed thereto, while the other is not provided with any projections 5. Namely, one electrode member has a cover film 4 to which projections 5 made of polyimide are affixed, while the other electrode member has a cover film 4 made of polyimide having a flat surface. Further, in order to prevent abrasion and sticking when the projections 5 and the flat film surface in contact with each other slide, a material having a low surface energy such as polytetrafluoroethylene (PTFE) is sputtered to one cover film 4, while an inorganic material is attached to the other cover film 4 so as to reduce mutual reactivity. In the fifth embodiment as well, as in the above embodiments, an insulating liquid can be interposed in the clearance between the stator electrode member 1a and the slider electrode member 1b.

Figure 8:
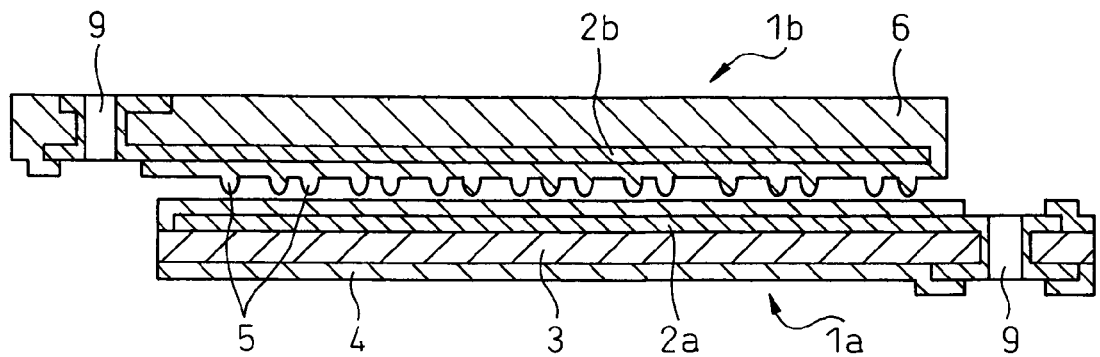
FIG. 8 is a sectional view of principal parts of an electrostatic motor built up of a set of a stator electrode member and a slider electrode member according to a sixth embodiment of the present invention.

FIG. 8 is a sectional view of principal parts of an electrostatic motor built up of a set of a stator electrode member 1a and a slider electrode member 1b according to a sixth embodiment of the present invention.

In the electrostatic motor according to the sixth embodiment, one of the stator electrode member 1a and the slider electrode member 1b uses a cover film 4 with which projections 5 are integrally formed or has the projections 5 integrally formed with the electrode member by molding as in the third embodiment shown in FIG. 4. The other electrode member uses a flat cover film 4 or is formed with flat surface by molding. Note that both electrode members may be provided with projections 5. In the example shown in FIG. 8, the stator electrode member 1a is formed by attaching a flat cover film 4 to the base film 3 provided with the drive electrode patterns 2 by a binder, while the slider electrode member 1b is prepared by molding and the projections 5 are integrally formed on the surface of the slider electrode member 1b facing the stator electrode member 1a. In this embodiment, the flat cover film 4 is formed from polyethylene, while the molded material having the projections 5 and the cover film 4 are formed from a polyimide. Further, in order to prevent the abrasion and sticking when both electrode members in contact with each other slide, as in the fifth embodiment, a material having a low surface energy such as PTFE is sputtered to one of the two electrode members, and an inorganic material is attached to the other of them in order to reduce the mutual reactivity. Alternatively, a material having the above effect can be used as the material of the cover film 4 etc. In the sixth embodiment as well, as in the above embodiments, an insulating liquid can be interposed in the clearance between the stator electrode member 1a and the slider electrode member 1b.

Figure 9:
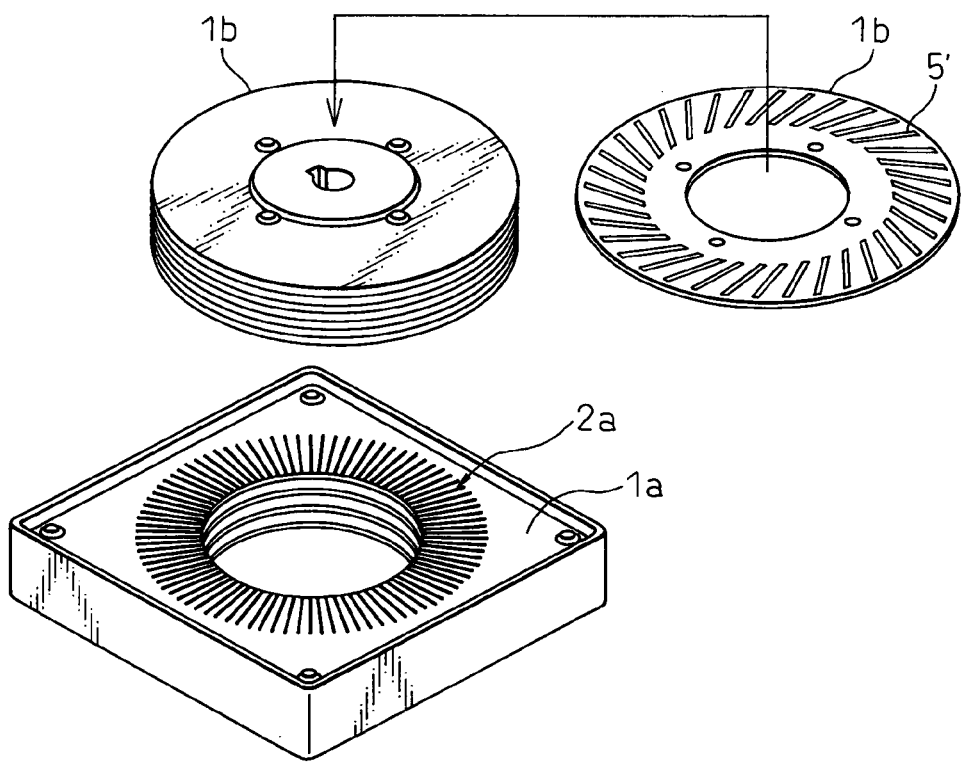
FIG. 9 is a perspective view of an electrostatic motor according to a seventh embodiment of the present invention.

FIG. 9 is a perspective view of an electrostatic motor according to a seventh embodiment of the present invention. The seventh embodiment shows an example of a rotation type electrostatic motor constituted by stacking a plurality of sets of stator electrode members 1a and slider electrode members 1b.

In the example shown in FIG. 9, the stator electrode member 1a is arranged so that the side where the drive electrode patterns 2a are provided faces upward, while the slider electrode member 1b is arranged so that the side where the drive electrode patterns 2b are provided faces downward. Further, ridge-shaped projections 5' are formed on the drive electrode pattern side of the slider electrode member 1b, while ridge-shaped projections 5' are deliberately not formed on the surface of the stator electrode member 1a facing the slider electrode member 1b.

The drive electrode patterns 2a and 2b of the stator electrode member 1a and the slider electrode member 1b of the rotary electrostatic motor are arranged about the rotation center thereof to extend radially as shown in FIG. 9. These drive electrode patterns 2a and 2b are prepared by using printed circuit board production technology. For this reason, the conductive portions of the drive electrode patterns project out from the base film 3. Further, when bonding cover films 4 to the surfaces where such drive electrode patterns 2a and 2b are provided, the shapes of the drive electrode patterns 2a and 2b push up the surfaces of the cover films 4. Namely, as a result, radially extending ridge-shaped projections 5' appear on the surfaces of the cover films 4.

Therefore, when preparing either of the stator electrode member 1a or the slider electrode member 1b (in this embodiment, the slider electrode member 1b), the adhesion layer is made thick between the conductors of the slider drive electrode patterns 2b so as to eliminate the step difference between the slider drive electrode patterns 2b and the rest of the surface of the base film 3 and then cover film 4 is attached to the base film 3. The opposite surface of the cover film 4 is formed with ridge-shaped projections 5' skewed with respect to the direction of the radially extending conductors of the slider drive electrode pattern 2b. Thus, the stator electrode member 1a is formed with ridge-shaped projections of the same pattern as the stator drive electrode patterns 2a due to the thickness of the stator drive electrode patterns 2a, and these ridge-shaped projections formed on the stator electrode member 1a and the ridge-shaped projections 5' formed on the slider electrode member 1b face and contact each other. However, since the ridge-shaped projections 5' of the slider electrode member 1b are skewed, the ridge-shaped projections 5' of the slider electrode member 1b will not fit in the valley portions formed between the ridge-shaped projections of the opposite stator electrode member 1a. In the seventh embodiment, the stacked sets of stator electrode members 1a and slider electrode members 1b may be placed in an insulating liquid of dimethylpolysiloxane or a fluorocarbon etc. so as to make the insulating liquid be interposed in the clearance between the stator electrode member 1a and the slider electrode member 1b.

Figure 10:
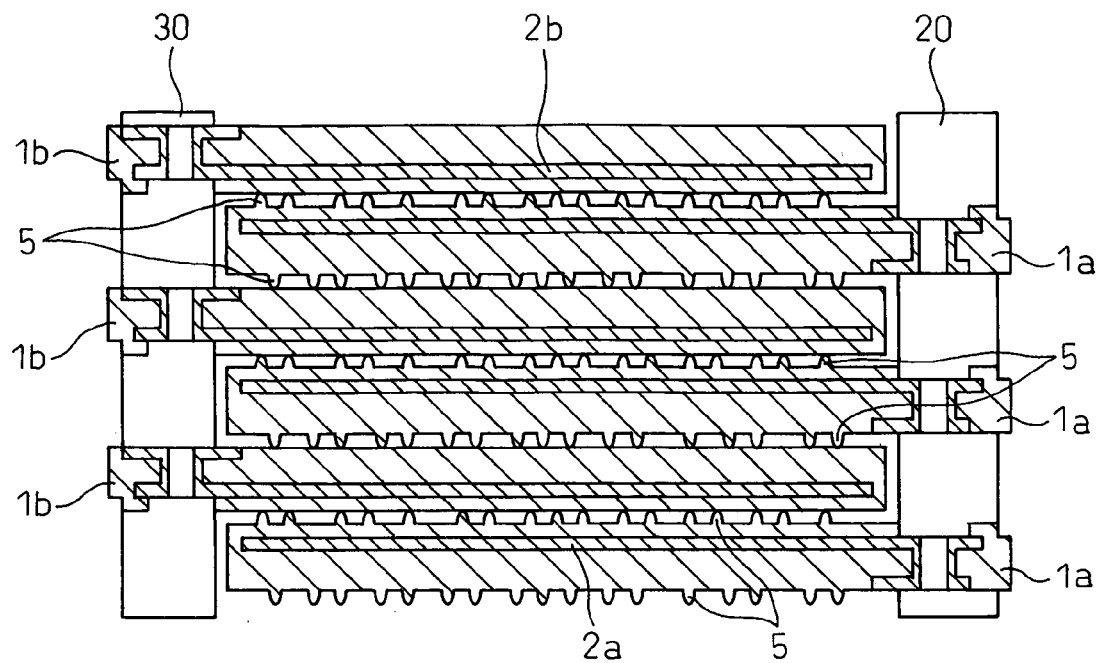
FIG. 10 is a sectional view of an electrostatic motor according to an eighth embodiment of the present invention.

FIG. 10 is a sectional view of an electrostatic motor according to an eighth embodiment of the present invention wherein a plurality of sets of stator electrode members 1a and slider electrode members 1b are stacked to generate a large torque. In the eighth embodiment, the stator electrode member 1a and the slider electrode member 1b are fixed to a stator frame 20 and a slider frame 30, respectively. The stator electrode members 1a and the slider electrode members 1b are alternately superimposed to constitute the electrostatic motor. Therefore, only one of the stator electrode member 1a and the slider electrode member 1b is formed with the projections 5 on both surfaces, while both surfaces of the other electrode member are flattened. In the example shown in FIG. 10, the projections 5 are formed on both the surfaces of the stator electrode members 1a, while both the surfaces of the slider electrode members 1b are flat. Note that it is not necessary to provide the projections 5 on the outermost surfaces of the stacked electrode members 1 (surfaces which do not face any electrode members 1). In the example shown in FIG. 10, the projections 5 are also provided on the bottom surface of the stator electrode member 1a in the lowermost layer, but accordingly it is not always necessary to provide the projections 5 on this surface.

Figure 11:
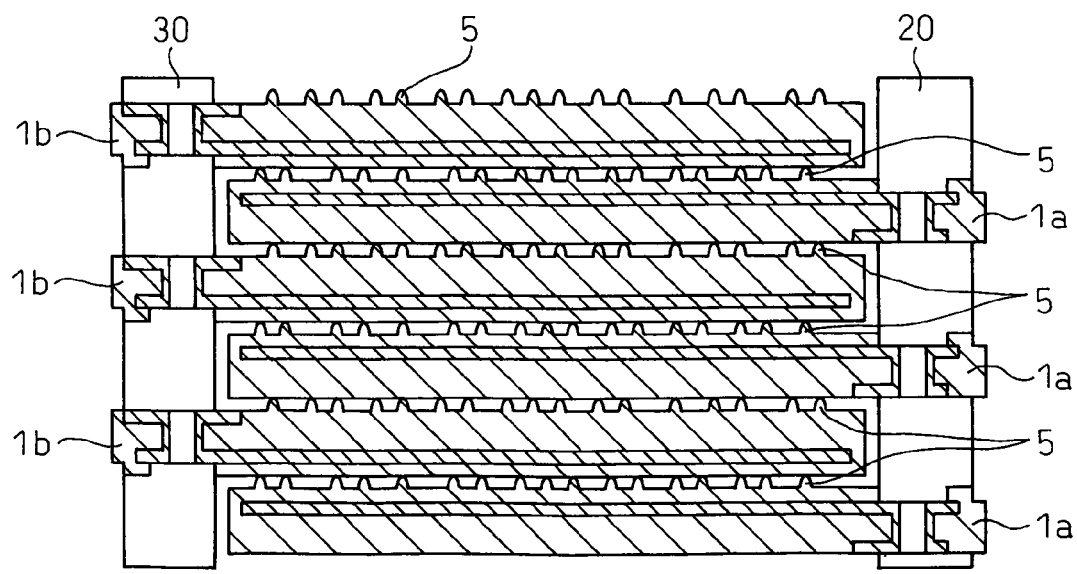
FIG. 11 is a sectional view of an electrostatic motor according to a ninth embodiment of the present invention.
Figure 12:
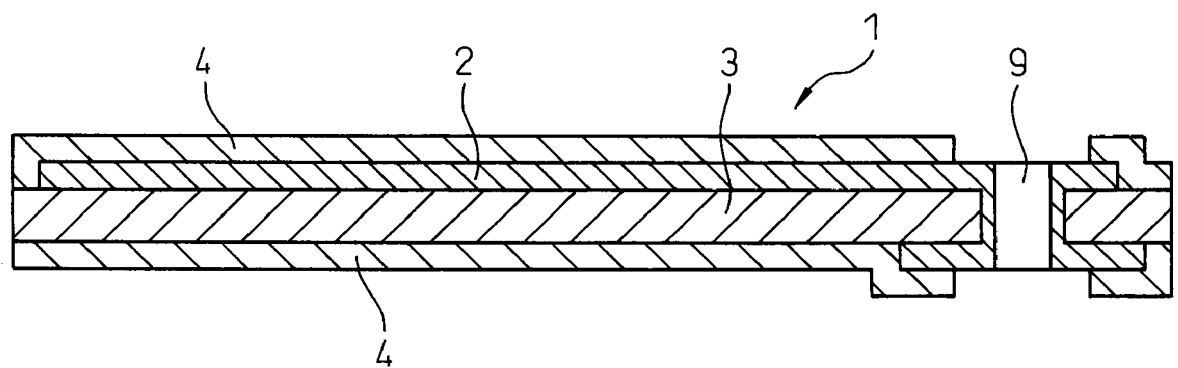
FIG. 12 is a sectional view of an electrode member configuring a stator electrode member or a slider electrode member of a conventional electrostatic motor.
Figure 13A:
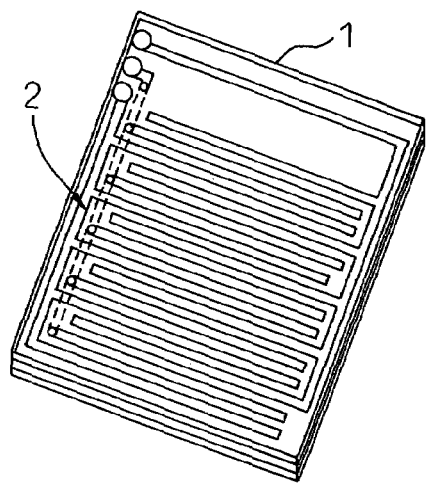
FIGS. 13A to 13D are views for illustrating a conventional linear electrostatic motor.
Figure 13B:
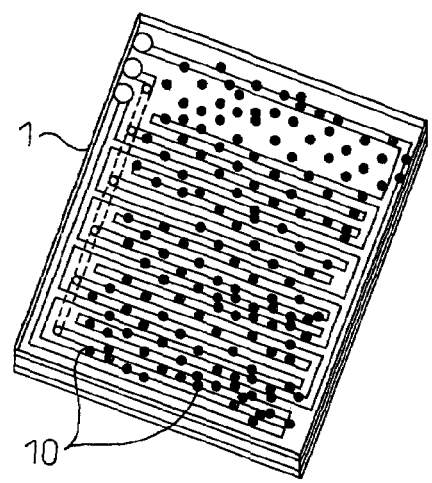
Figure 13C:
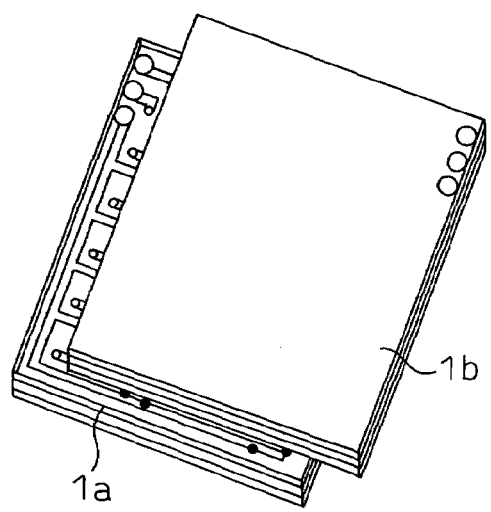
Figure 13D:
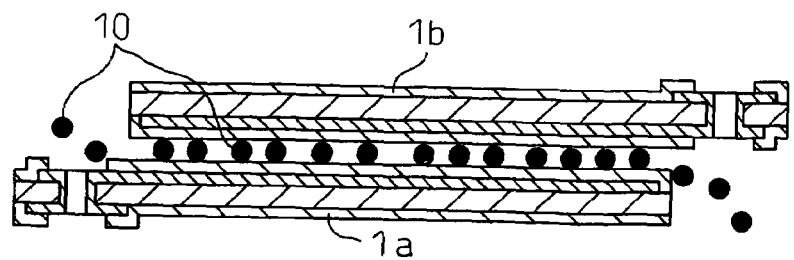

FIG. 11 is a sectional view of an electrostatic motor according to a ninth embodiment of the present invention similar to the eighth embodiment of the present invention, wherein a plurality of sets of stator electrode members 1a and slider electrode members 1b are stacked to generate a large torque. In the ninth embodiment, projections 5 are provided on only one surface of each of the stator electrode members 1a and the slider electrode members 1b. The stator electrode members 1a and the slider electrode members 1b are alternately superimposed and fixed to the stator frame 20 and the slider frame 30, respectively. An electrostatic motor is thus constituted. In the example shown in FIG. 11, the surfaces of the stator electrode members 1a where the stator drive electrode patterns 2a are formed are provided with the projections 5, while the surfaces of the slider electrode members 1b opposite to where the slider drive electrode patterns 2b are formed are provided with the projections 5. The electrostatic motor is constituted by alternately superimposing such stator electrode members 1a and slider electrode members 1b. The clearances between the stator electrode members 1a and the slider electrode members 1b are maintained by these projections 5, so that the slider electrode members 1b relatively slide with respect to the stator electrode members 1a while contacting these projections 5 on the flat surface. In the eighth embodiment and the ninth embodiment as well, as in the seventh embodiment, these stacked stator electrode members 1a and slider electrode members 1b may be placed in an insulating liquid to cause the insulating liquid to be interposed in the clearances between the stator electrode members 1a and the slider electrode members 1b.

In the above embodiments, an insulating gas may be filled in the clearances between the facing surfaces of the stator electrode members 1a and the slider electrode members 1b or the insulating liquid may be filled in it. As the insulating liquid, use is made of for example dimethyl polysiloxane or a fluorocarbon. Further, the members constituting the portions where the stator electrode members 1a and the slider electrode members 1b contact, that is, the projections 5 and the surfaces contacting the projections 5 (cover film 4), are preferably formed by a polyimide or a fluororesin excellent in sliding property.

While the present invention has been described above with reference to specific embodiments shown in the accompanying drawings, these embodiments are only for explanatory and are not limitative. Therefore, the range of the present invention is only restricted by the claims. The preferred embodiments of the present invention may be modified or changed in any way without departing from the scope of the claims.

What is claimed is:

1. An electrostatic motor comprising a stator electrode member and a slider electrode member relatively sliding while contacting each other, wherein:
   a plurality of minute projections are provided on facing surfaces of said stator electrode member and said slider electrode member, and a clearance between said stator electrode member and said slider electrode member is maintained by mutual contact of said projections, said projections have a ridge-shape, and said ridge-shaped projections of said stator electrode member and said ridge-shaped projections of said slider electrode member are skewed from each other by a predetermined angle.

2. The electrostatic motor according to claim 1, wherein a liquid is interposed in a clearance between said stator electrode member and said slider electrode member in order to reduce a frictional force due to contact of said stator electrode member and said slider electrode member.

3. The electrostatic motor according to claim 2, wherein said liquid is an insulating liquid.

4. The electrostatic motor according to claim 2, wherein said liquid is dimethyl polysiloxane.

5. The electrostatic motor according to claim 2, wherein said liquid is a fluorocarbon.

6. The electrostatic motor according to claim 1, wherein said stator electrode member or said slider electrode member includes a molded member for forming a contact surface, and one or both of a conductor or a portion having a mechanical function, said one or both of conductor or portion attached to said molded member.

7. The electrostatic motor according to claim 1, wherein said stator electrode member or said slider electrode member includes a member for forming a contact surface, and said member is formed from a polyimide or a fluororesin.

* * * * *